Oct. 8, 1946.  E. C. BOOTH  2,408,907
METAL FURNITURE
Filed Aug. 31, 1944  2 Sheets-Sheet 1
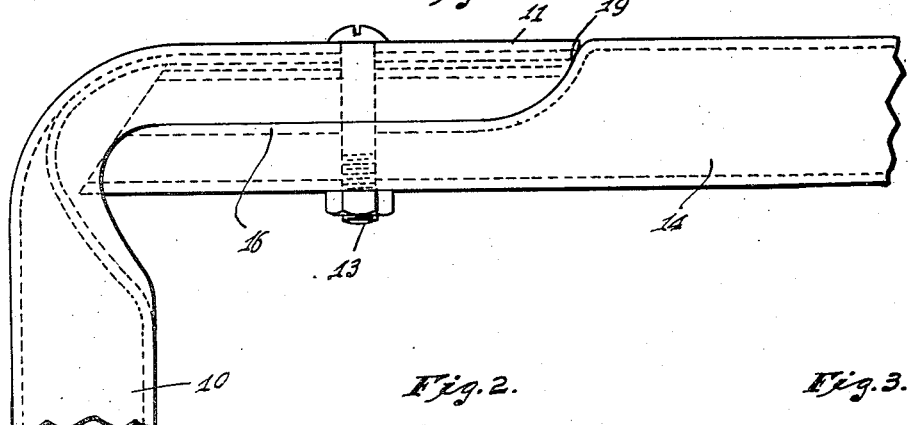
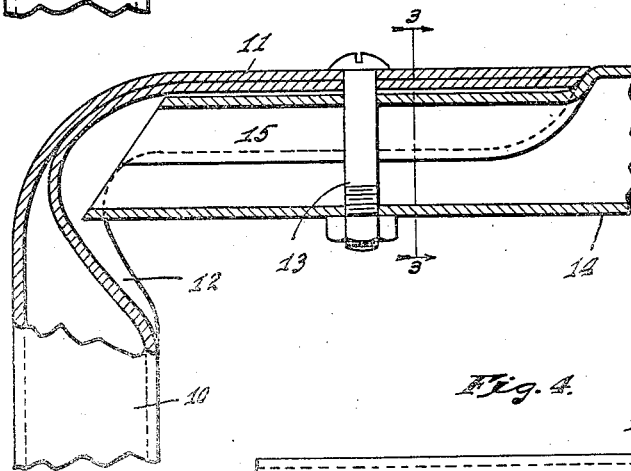
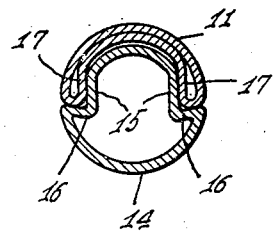
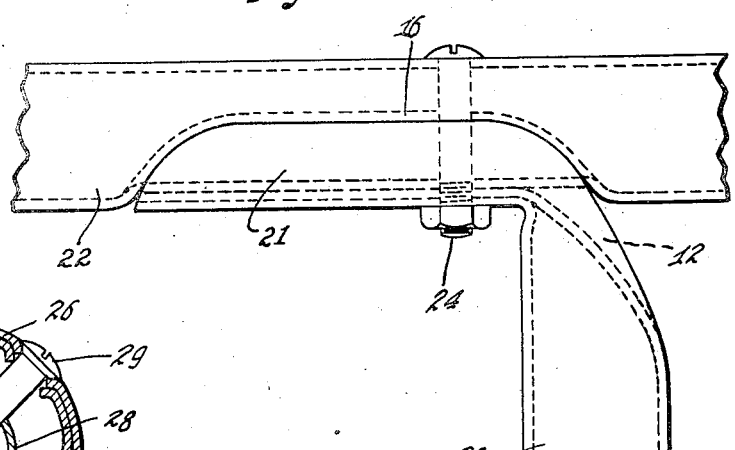
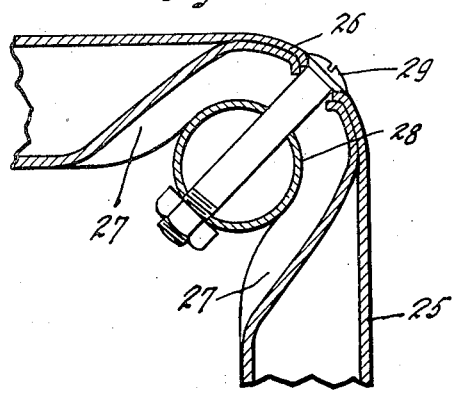
INVENTOR.
EARL C. BOOTH,
BY
ATTORNEYS.

Oct. 8, 1946.  E. C. BOOTH  2,408,907
METAL FURNITURE
Filed Aug. 31, 1944  2 Sheets-Sheet 2
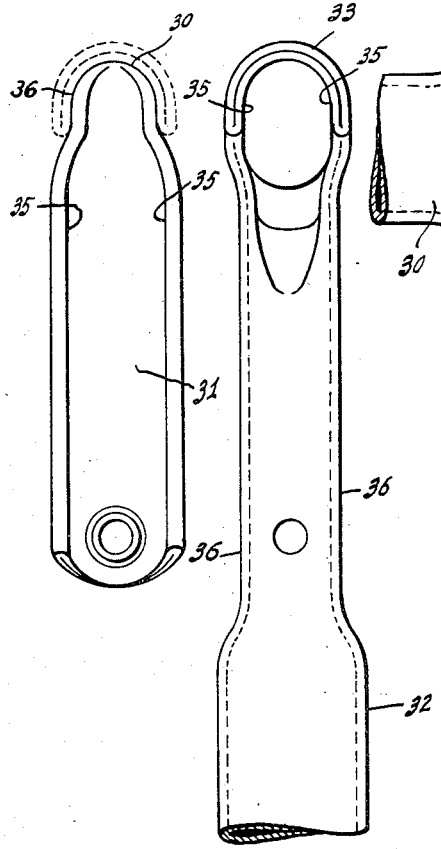
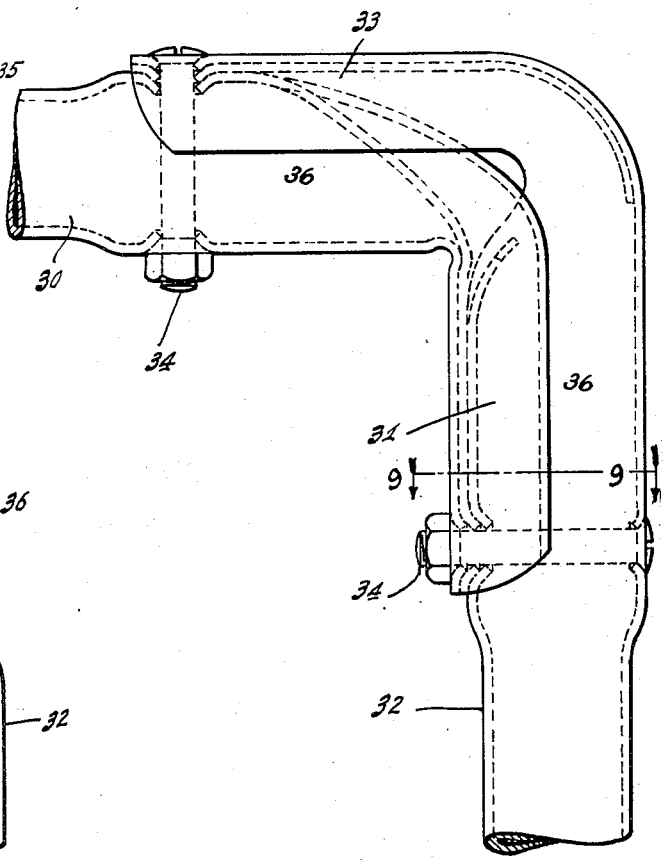
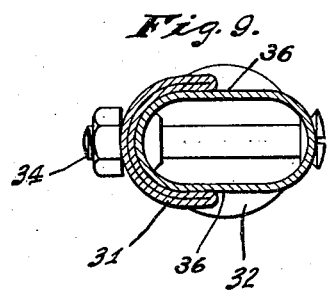
INVENTOR.
EARL C. BOOTH,
BY
ATTORNEYS.

Patented Oct. 8, 1946

2,408,907

UNITED STATES PATENT OFFICE 2,408,907

METAL FURNITURE

Earl C. Booth, Columbus, Ind., assignor to Noblitt-Sparks Industries, Inc., Columbus, Ind., a corporation of Indiana Application August 31, 1944, Serial No. 552,141

9 Claims. (Cl. 287—54)

My invention relates to a joint structure for structural metal tubing, and has for its object the provision of a joint structure by which two metal tubes may be removably connected together in a manner which will provide adequately for the transmission of stresses from one tube to the other. A further object of my invention is to produce a joint structure which will be sightly in appearance and which will not involve expensive manufacturing operations.

In carrying out my invention, I collapse for a portion of its length one of the tubes which are to be joined together, and I so shape the collapsed portion of the tube that it will fit against the exterior surface of the other tube. In the preferred form of construction, the collapsed tube-portion is made arcuate in cross section with the curvature of its outer surface conforming to the curvature of the uncollapsed tube-section, and that portion of the other tube which is to receive the collapsed portion is displaced inwardly in such a manner that the outer surface of the collapsed tube-portion will be flush with the outer surface of the other tube.

The accompanying drawings illustrate my invention: Fig. 1 is a plan view of one form of joint between the ends of two tubes which lie perpendicular to each other; Fig. 2 is an axial section through the joint of Fig. 1; Fig. 3 is a transverse section on the line 3—3 of Fig. 2; Fig. 4 is a plan view of a modified form of joint useful where one tube is joined to an intermediate point on the other; Fig. 5 is a sectional view illustrating a joint for use when the two joined tubes are not coplanar; Fig. 6 is a view similar to Fig. 1 illustrating a modified form of joint; Figs. 7 and 8 are end elevations of the two tubes which when united form the joint of Fig. 6; and Fig. 9 is a section on the line 9—9 of Fig. 6.

The joint structure illustrated in Fig. 1 is one suitable for use where the ends of two tubes of the same diameter and lying perpendicularly to each other are to be joined. One of the tubes, here shown as the tube 10, is collapse, substantially completely, for a distance back from one end. The collapsed portion of the tube, indicated by the reference numeral 11, is given an arcuate shape in cross-section and is bent perpendicularly to the body of the tube with the concave side of the arcuate cross-section on the inside of the bend. The change in the cross-sectional shape of the tube 10 from the circular shape of the tube-body to the arcuate shape of the collapsed portion 11 is desirably not an abrupt change, but instead the tube is formed so that the concave inner surface of the collapsed portion 11 merges with the uncollapsed body of the tube through a groove 12 of gradually decreasing depth. The collapsed cross-section of the tube at the point where it is bent makes possible a bend of very short radius.

The inner surface of the collapsed portion 11 of the tube 10 fits against the outer surface of the other tube 14, and is secured thereagainst by a bolt 13. In the preferred structure, the engaging surfaces of the tube 14 and of the collapsed portion 11 are so formed that the outer surface of the collapsed portion will be flush with the outer surface of the body of the tube 14. To this end, that portion of the wall of the tube 14 which is to be engaged by the collapsed portion 11 is offset inwardly, as will be clear from Fig. 3. As shown, the inwardly offset portion of the tube 14 is provided in opposite sides with indentations or grooves extending back for a distance from its end and providing two approximately parallel walls 15 and two axially extending shoulders 16 contiguous to such parallel wall-portions. The exterior surface of the collapsed portion 11 of the tube 10 is shaped to conform to the curvature of the undistorted body of the tube 14, while the inner surface of the collapsed portion 11 is formed in a channel section having side walls 17 adapted to receive between them the two parallel walls 15 of the tube 14.

When the two tubes 10 and 14 are placed together as shown in Figs. 1, 2, and 3, the interengagement of the walls 15 and 17 will serve to hold the two tubes positively in coplanar relationship. When the bolt 13 is tightened, the edges of the collapsed portion 11 will be drawn tightly against the shoulders 16, thus holding the two tubes in the proper angular relationship to each other.

At their inner ends the shoulders 16 curve smoothly toward the undistorted portion of the tube 14, as indicated at 19, and the end of the collapsed portion 11 of the tube 10 is trimmed to fit against this curved portion of the shoulder. The end of the tube 14 is desirably beveled so that it does not interfere with the inner surface of the bend in the collapsed portion 11 and so that its extreme tip will lie within the groove 12.

The joint shown in Figs. 1, 2, and 3 is strong and rigid against all possible disturbing forces. The interengaging side walls 15 and 17 prevent any rotation of the tube 14 about the axis of the tube 10. The bolt 13, by holding the edges of the collapsed portion 11 against the elongated shoulders 16 prevents any relative angular displacement of the two tubes in their common plane, and also prevents rotation of the tube 14 about its own axis. At the same time, the joint is attractive in appearance, as the outer surface of the collapsed portion 11 is substantially a continuation of the outer surface of the tube 14 while the extreme end of the tube 14 is inconspicuously hidden within the groove 12.

The joint illustrated in Fig. 4 is one suitable for use where one tube, designated as 20, is to be secured in a perpendicular position against the side of another tube 22 at an intermediate point thereof. In this construction, the tube 20 is provided with a collapsed end portion 21 similar to the collapsed portion 11 of the tube 10, but the collapsed portion 21 is bent perpendicularly to the body of the tube so that its inner surface as well as the groove 12 through which such inner surface merges with the undistorted body of the tube 20 lies on the outside of the bend. Here again the collapsed cross-section of the tube makes possible a bend of very short radius. Desirably the collapsed portion 21 and that portion of the tube 22 which it engages are formed in cross section like the interfitting portions of the tubes 10 and 14 in Figs. 1 to 3. A bolt 24 extending diametrically through the tube 22 and collapsed portion 21 serves to secure the two tubes together. In rigidity and appearance, the joint of Fig. 4 possesses the same advantages as that of Figs. 1, 2, and 3.

The joint of Fig. 5 may be employed at a point where the two tubes do not lie in a common plane. In the specific construction shown, one tube 25 is collapsed, as at 26, for a portion of its length, an arcuate cross-sectional shape is imparted to the collapsed portion 26 as in the joints previously described, and the inner surface of the collapsed portion merges with the outer surface of the undistorted tube through grooves 27 of gradually diminishing depth similar to the groove 12 in Figs. 1 to 4. The collapsed portion 26 of the tube 25 is bent so that the two undistorted sections of the tube lying beyond it will be disposed perpendicularly to each other, the radius of the bend being such that the edges of the collapsed portion 26 will fit against the outer surface of a second tube 28 disposed perpendicularly to the plane of the bent tube 25. Desirably, the edges of the collapsed portion 26 embrace the tube 28 for substantially 180°. A bolt 29 extending through the collapsed portion 26 and diametrically through the tube 28 serves to hold the two tubes together. The bolt 29 is preferably located in the plane bisecting the angle between the two undistorted portions of the tube 25.

The joint structure shown in Figs. 6 to 9 is a substitute for that shown in Figs. 1 to 3 in that it may be used for joining together the ends of two tubes disposed at right-angles to each other. In the joint of Figs. 6 to 9 one of the tubes, shown as the tube 30, has a collapsed end portion 31 formed generally similarly to the collapsed portion of the tube 20 in Fig. 4 and bent so that it lies perpendicularly to the axis of the tube 30 with the inner surface of the collapsed portion on the outside of the bend. The other tube 32 has a collapsed end portion 33 formed generally similarly to the collapsed portion 11 of the tube 10 in Figs. 1 to 3 and bent so that it extends perpendicularly to the tube 32 with the inner surface of the collapsed portion on the inside of the bend. The two tubes 30 and 32 are put together in the manner illustrated in Fig. 6 with the collapsed portion of each engaging the outer surface of the other, and the two tubes are then secured together by bolts 34 each passing through a collapsed portion of one tube near one end thereof and through the other tube, such bolts lying in the common plane of the two tubes.

I have found that the rigidity provided by the joint of Fig. 6 can be increased if the collapsed portions 31 and 33 are provided interiorly with opposed surfaces 35 which approach parallelism and if the tube-section received within each collapsed portion is also provided with approximately parallel walls adapted to be received between the walls 35. To accomplish this result, each of the tubes 30 and 32 is flattened in the common plane of the tubes over that portion of its length in contact with the collapsed portion of the other tube, such flattening providing two substantially parallel walls 36 spaced to be received between the surfaces 35.

It is to be noted that in each of the structures described above the collapsed tube-portion engages the other tube over surfaces which lie in, or which contain portions lying in, planes extending longitudinally of one tube and substantially parallel to the bolt by which the tubes are secured together. In such a construction, forces transmitted from one tube to the other through such surfaces have no substantial component capable of introducing tensile stresses in the bolt.

I claim as my invention:

1. In combination, a metal tube, the wall of said tube being indented on opposite sides of the tube to provide two generally parallel wall portions and shoulders contiguous thereto extending longitudinally of the tube, a second metal tube, said second tube being collapsed to bring together diametrically opposite parts of its wall and create a double-layered portion, said double-layered portion being curved in cross-section with the curvature of the outer surface of the tube and the curvature of the outer layer conforming substantially to the curvature of the outer surface of the tube and with the inner layer formed to provide two opposed surfaces receiving between them the generally parallel walls of the first tube, the edges of the collapsed portion of the second tube being seated against the shoulders of the first tube, and a bolt extending transversely through both tubes generally parallel to said parallel walls.

2. In combination, a metal tube, the wall of said tube being indented on opposite sides of the tube to provide two generally parallel wall portions and shoulders contiguous thereto extending longitudinally of the tube, a second metal tube, said second tube being collapsed to bring together diametrically opposite parts of its wall and create a double-layered portion, said double-layered portion being curved in cross-section with the curvature of the outer layer conforming substantially to the curvature of the outer surface of the tube and with the inner layer formed to provide two opposed surfaces receiving between them the generally parallel walls of the first tube, the edges of the collapsed portion of the second tube being seated against the shoulders of the first tube, and means acting between said tubes for forcing the edges of the collapsed portion of the second tube into engagement with the shoulders of the first tube.

3. In combination, a metal tube, the wall of said tube being offset inwardly for a portion of the length and for a portion only of the circumference of the tube to leave another portion of the tube-circumference undistorted, a second metal tube, said second tube being collapsed to bring together diametrically opposite parts of its wall and create a portion of double thickness, said collapsed portion of the second tube overlapping the offset portion of the first tube and being formed interiorly to fit against at least a portion of the outer surface of such offset portion, and means acting between said collapsed and offset portions for holding them together.

4. The invention set forth in claim 3 with the addition that said collapsed portion is curved in cross-section so that its outer face is substantially flush with the outer surface of the undistorted portion of said first tube.

5. In combination, a metal tube, the wall of said tube being indented on opposite sides of the tube to provide two shoulders extending longitudinally of the tube, a second metal tube, said second tube being collapsed to bring together diametrically opposite parts of its wall and create a double-layered portion, said double-layered portion being curved in cross-section, the edges of the collapsed portion of the second tube being seated against the shoulders of the first tube, and means acting between said tubes for forcing the edges of the collapsed portion of the second tube into engagement with the shoulders of the first tube.

6. In combination, a cylindrical metal tubular member collapsed over a part of its length to create a portion of double thickness, a second cylindrical member, a bolt extending through the double-thickness portion and said second member for securing them together, said double-thickness portion and second member being provided with interengaging surfaces at least portions of which are disposed in planes extending longitudinally of the second member and lying on opposite sides of and substantially parallel to said bolt.

7. The invention set forth in claim 6 with the addition that said double-thickness portion is bent relative to the uncollapsed portion of the first named cylindrical member.

8. The invention set forth in claim 6 with the addition that both said members lie in a common plane.

9. The invention set forth in claim 6 with the addition that said double-thickness portion is arcuate in cross-section and engages said second member near one end thereof, said double-thickness portion being bent over the end of the second member.

EARL C. BOOTH.